(12) United States Patent
Bhattacharjee et al.

(10) Patent No.: US 12,423,345 B2
(45) Date of Patent: Sep. 23, 2025

(54) THEME DETECTION WITHIN A CORPUS OF INFORMATION

(71) Applicant: Amazon Technologies, Inc., Reno, NV (US)

(72) Inventors: Kasturi Bhattacharjee, Sunnyvale, CA (US); Rashmi Gangadharaiah, San Jose, CA (US); Senthil C Chidambaram, Folsom, CA (US); Ankit Kapoor, Seattle, WA (US); Sharon Shapira, Sammamish, WA (US); Tony Chun Tung Ng, San Ramon, CA (US); Deepak Seetharam Nadig, San Jose, CA (US)

(73) Assignee: Amazon Technologies, Inc., Reno, NV (US)

( * ) Notice: Subject to any disclaimer, the term of this patent is extended or adjusted under 35 U.S.C. 154(b) by 225 days.

(21) Appl. No.: 18/065,803

(22) Filed: Dec. 14, 2022

(65) Prior Publication Data

US 2024/0160651 A1 May 16, 2024

Related U.S. Application Data

(60) Provisional application No. 63/383,577, filed on Nov. 14, 2022.

(51) Int. Cl.
*G06F 16/35* (2025.01)
*G06F 16/334* (2025.01)
*G06F 16/34* (2025.01)

(52) U.S. Cl.
CPC .......... *G06F 16/35* (2019.01); *G06F 16/3344* (2019.01); *G06F 16/345* (2019.01)

(58) Field of Classification Search
CPC .... G06F 16/35; G06F 16/3344; G06F 16/345; G06F 16/36
See application file for complete search history.

(56) References Cited

U.S. PATENT DOCUMENTS

| | | | |
|---|---|---|---|
| 12,020,786 B2 * | 6/2024 | Zhu | G16H 50/20 |
| 2007/0156732 A1 * | 7/2007 | Surendran | G06Q 10/107 |
| 2022/0261545 A1 | 8/2022 | Lauber | |

(Continued)

OTHER PUBLICATIONS

International Search Report and Written Opinion issued Jul. 21, 2023 in PCT Application No. PCT/US2023/067604.

*Primary Examiner* — Jay A Morrison
(74) *Attorney, Agent, or Firm* — Hogan Lovells US LLP

(57) ABSTRACT

Systems and methods are used to detect underlying themes from a collection of documents at an aggregated level. A representative set of documents may be selected from a cluster of documents, with the representative set of documents corresponding to a general theme of the cluster. Candidate theme phrases may then be extracted from the documents and used to generate document embeddings and candidate phrase embeddings, which may be ranked, such as with a diversity-based ranking approach. Certain candidates may be selected from the ranking. Each of the documents forming the representative set may then be concatenated and a query embedding may be generated and ranked against the candidate phrases. In this manner, a collection of phrases associated with both the general underlying theme of the cluster, along with granular topics associated with that theme, may be identified.

20 Claims, 8 Drawing Sheets

(56) References Cited

U.S. PATENT DOCUMENTS

| | | | |
|---|---|---|---|
| 2022/0383268 A1* | 12/2022 | Chen | G06Q 10/0633 |
| 2023/0289527 A1* | 9/2023 | Booth | G06Q 50/18 |
| 2024/0012844 A1* | 1/2024 | Subraveti | G06F 16/35 |
| 2024/0104055 A1* | 3/2024 | McAnallen | G06F 16/164 |

* cited by examiner

THEME DETECTION WITHIN A CORPUS OF INFORMATION

CROSS-REFERENCE TO RELATED APPLICATIONS

This application claims priority to and the benefit of U.S. Provisional Patent Application No. 63/383,577, titled "THEME DETECTION WITHIN A CORPUS OF INFORMATION," filed Nov. 14, 2022, the full disclosure of which is hereby incorporated by reference in its entirety for all purposes.

BACKGROUND

As an ever-increasing amount of data and content is being stored electronically, there is a corresponding need to improve the ways in which this data and content can be identified, located, and retrieved. Large data sets may be difficult to effectively analyze without significant investments of time and resources. Furthermore, certain methods for identifying related information within a data sets may lack sufficient diversity to provide meaningful information. Because of the time and resources necessary to identify evaluate data, relevant information may be lost within data sets or may not be evaluated in a timely manner, such that eventual evaluation is late and no longer applicable for interested parties.

BRIEF DESCRIPTION OF THE DRAWINGS

Various embodiments in accordance with the present disclosure will be described with reference to the drawings, in which.

DETAILED DESCRIPTION

In the following description, various embodiments will be described. For purposes of explanation, specific configurations and details are set forth in order to provide a thorough understanding of the embodiments. However, it will also be apparent to one skilled in the art that the embodiments may be practiced without the specific details. Furthermore, well-known features may be omitted or simplified in order not to obscure the embodiment being described.

Approaches described and suggested herein relate to detection of underlying themes within a collection of documents at an aggregated level. In particular, various embodiments introduce unsupervised machine learning (ML) and/or natural language processing (NLP) techniques to identify, within a representative set of data, one or more underlying themes associated with corpus of information. For example, a cluster of text documents (e.g., user submitted information, evaluations, data corresponding to items within a database, etc.) may be aggregated and prioritized, and then clustered to identify groups of related documents from the collection of documents. Given the cluster of documents, systems and methods detect underlying themes from the documents, which may be represented as short phrases that capture one or more topics or issues discussed within the cluster. A set of documents from a cluster may be identified and selected, for example due to a distance of the documents from a center of the cluster. This set of documents may then be evaluated and one or more candidate theme phrases may be extracted from the documents. These extracted phrases may be used to generate document embeddings and candidate embeddings to rank candidate phrases using one or more ranking techniques. In at least one embodiment, a query embedding is generated by concatenating all documents from the representative set of the cluster. The query embedding and the candidate embedding may then be used to rank candidate theme phrases to obtain a final set of themes similar to the representative set of the cluster.

Various other such functions can be used as well within the scope of the various embodiments as would be apparent to one of ordinary skill in the art in light of the teachings and suggestions contained herein.

Figure 1:
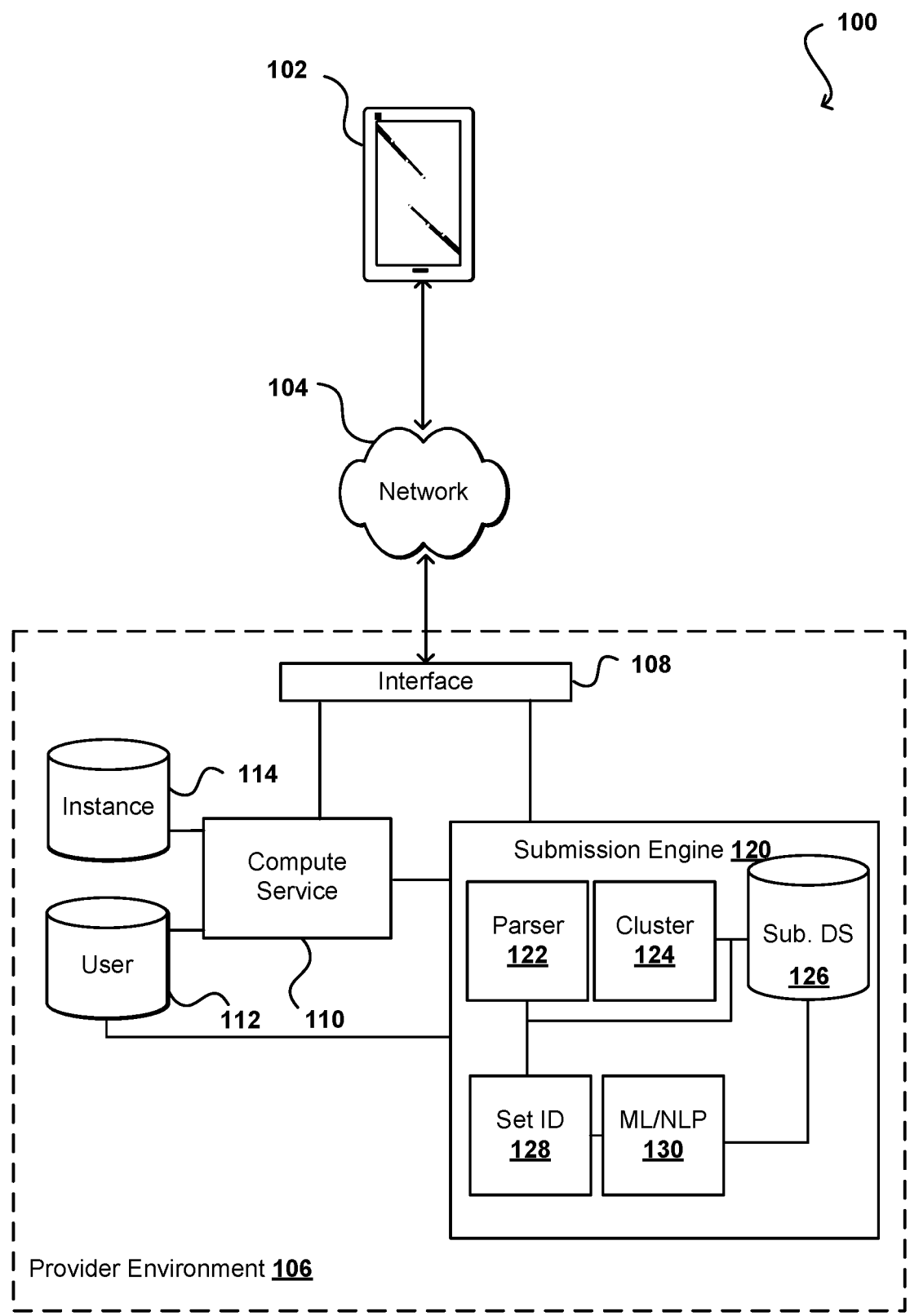
FIG. 1 illustrates a theme detection system that can be utilized in accordance with various embodiments.

FIG. 1 illustrates an example environment 100 in which aspects of the various embodiments can be implemented. In this example, a computing device 102 is able to make a call or request across one or more networks 104 to a provider environment 106. The computing device can include any appropriate computing device capable of formulating and transmitting such a request, as may include a desktop computer, notebook computer, tablet, smartphone, smart television, wearable computer, set-top box, gaming console, and the like. The network(s) can include any appropriate network, such as the Internet, a local area network (LAN), a cellular network, an Ethernet, or other such wired and/or wireless network. The provider environment 106 can include any appropriate resources for providing one or more of content, resources, or services from a resource prod provider, as may include various servers, data stores, and other such components known or used for providing content from across a network (or from the "cloud").

In this example, a request received to the provider environment 106 can be received by an interface layer 108 of the environment. As known for network environments, the interface layer can include components such as interfaces (e.g., APIs), load balancers, request and/or data routers, and the like. In at least one embodiment, the provider environment 106 is associated with a provider that enables the computer device 102 to access one or more services, such as compute services, storage services, content services, and/or the like. The computer device 102 may be associated with a user having a user account that, upon verification of credentials for the user account, the user may access different products or services. In this example, a compute service 110 is provided where a user can launch one or more compute instances using the provider environment 106.

The compute service 110 may access information from one or more data stores 112 and then allocate and launch one or more instances based, at least in part, on instance configuration data 114. In this manner, the user may provide a request, provide configuration information for the request, and then use one or more launched instances. As noted, the compute service 110 is provided as one non-limiting example and it should be appreciated that various techniques associated with the present disclosure may be applied to other products, services, content, and the like available through one or more provider environments.

In some embodiments, the provider environment 106 may receive and/or request additional information from the user. For example, the provider environment 106 may include a portal for the user to submit information regarding the content and/or services available through the provider environment 106. The information could include user comments on layout or design of the user, user comments on support tickets (e.g., resolution), user submission of support tickets, user feature requests, and the like. In at least one embodiment, this information may all collectively be referred to as "feedback" or "user submissions," among other options. In certain embodiments, a submission engine 120 may be associated with a particular product, content, or service of the provider environment 106.

Returning to the example of compute instances, the submission engine 120 may be associated with an offering from the provider environment 106 for compute instances, and therefore, it may be assumed that all information (e.g., feedback, comments, suggestions, etc.) provided through the submission engine 120 is related to the compute instances. However, in at least one embodiment, the provider environment 106 may offer a variety of content, services, and the like to users and the submission engine 120 may be used globally, such as at a landing page for the provider environment 106. Submissions may be received in the form of unstructured text, selected content elements, audio, images, video, or combinations thereof. For example, the user may provide a textual input identifying positive and/or negative aspects of the environment, requesting additional content or features, or providing information regarding support and/or troubleshooting (e.g., success, failure, etc.).

The illustrated submission engine 120 includes an input parser 122 which can process the submitted data to, for example, parse human-readable information into different key phrases or words. Additionally, the input parser 122 may use word stemming or stop word removal in order to identify key portions of the input provided by the user. Information may be aggregated, prioritized, and then clustered using a clustering service 124. For example, documents (e.g., text associated with the inputs) may be grouped together based on their similarities, where more similar documents are clustered together while less similar documents may be positioned a distance away from other clusters. The clustering service 124 may collect information from a plurality of users, such as from a submission data store 126, that may collect information from a number of users that utilize the provider environment 106. The clustering service 124 may be executed at different times, such as on a weekly or monthly schedule, or may be executed on demand, among other options.

Embodiments may further include a set identifier 128 that may be used along with, or as part of, one or more machine learning systems 130. The set identifier 128 may receive information from the clustering service 124 to identify or otherwise select a set of documents from one or more clusters, where the set of documents may be considered a representative set of documents for the cluster due to respective distances from a center of the cluster. These documents may then be evaluated to identify different phrases associated with the theme of the document. For example, the ML/NLP systems 130 may extract and then embed information from the set of documents to generate one or more embeddings. These embeddings may be used rank different themes in order to identify relevant or important themes for each cluster. As will be described herein, various embodiments may also deploy diversity based theme detection techniques to identify documents within the representative set that are not only semantically similar to the cluster itself, but also are diverse from one another, thereby providing a more accurate view of how topics are discussed within a given theme.

Approaches in accordance with various embodiments can be used to detect underlying themes from a cluster of data, such as text documents, at an aggregated level. In at least one embodiment, themes may correspond to short phrases that capture a topic or issued discussed or otherwise presented within a given cluster. Systems and methods may implement ML or NLP techniques to evaluate the documents, extract phrases associated with the themes, generate embeddings, and then rank candidate phrases. In at least one embodiment, the ML/NLP techniques may be unsupervised (e.g., without human provided labels) to provide for an automated system that can be deployed without significant human training and interaction. Furthermore, the system may be part of a service that executes at different time intervals, further automating the process associated with identifying salient information from a potentially large collection of information.

Embodiments of the present disclosure address problems associated with developing one or more models that can be generalized across multiple services or offerings. For example, submissions associated with a compute service may be different from submissions associated with a content service which may further be different from submissions associated with troubleshooting. Systems and methods may implement one or more techniques to enable the ML/NLP systems to work over a wide range of services, content, and the like. Furthermore, embodiments address problems associated with variables and noise within data, especially when that data is user-generated, such as associated with unstructured text. For example, text may be discussing a particular topic, but the way the information is conveyed may vary from user to user. Accordingly, data that belongs to a common cluster may be challenging to identify. By way of example, a first user may provide comments such as "I am tired of seeing the survey pop up every time I log in, but otherwise I like the new interface" while a second user may provide comments such as "Why can't a turn off the welcome message?" Both of these comments are associated with notifications when the user is using the environment, but each is conveyed in a different way that may be challenging to identify and particularize to enable the provider to make improvements. That is, the underlying general theme is similar or related (e.g., notifications), but the finer-grain issue is varied (e.g., surveys versus welcome messages). Various embodiments address these concerns by using clustering to identify specifically related data and then generating embeddings to particularize and rank themes within the clusters. This information may then be used to prompt or otherwise record submissions received within the environment, which may then be used to prioritize or map new features or improvements to the environment.

Present embodiments address and overcome problems associated with alternative methods of identifying themes within sets of data, such as summary generation using large pre-trained models, such as a Bayesian Additive Regression Tree (BART) or a Text-to-Text Transfer Transformer (T5). These systems suffer from problems such as generating themes/summaries that are at least a sentence or two in length and, moreover, failing to capture the diversity typically found in user-provided submission clusters that may include numerous issues within a single document. Systems and methods address these problems by deploying unsupervised summarization techniques including at least one or more graph-based ranking strategies, among various other improvements described herein.

Embodiments of the present disclosure may extract themes from documents that are closest to a centroid of a cluster. For example, for a centroid-based clustering approach, these close documents may capture a central theme or overall topic associated with the cluster. In at least one embodiment, a set number of documents may be selected from the cluster. The number of documents may be based on a total number of documents within the cluster or may be a fixed number. For example, larger clusters may select a larger number of documents closer to the center than smaller clusters. In certain embodiments, a number of documents selected may be tunable based on one or more parameters. In one example, a number of documents are selected as being representative of members of the cluster. As noted, the number of documents may be selected to provide a balance between a good representation of topics and also provide sufficient diversity in the topics discussed, while also considering processing resources. In at least one embodiment, the selected set of documents may be referred to as a representative set of the cluster.

Systems and methods may also use candidate theme phrase extraction in order to identify themes or topics associated with the documents. For example, candidate theme phrases may be extracted from the representative set of clusters. In various embodiments, candidate theme phrases may be processed, such as to remove stop-words or for word stemming, among other options, and then bigrams and trigrams may be selected for each document in the representative set. Accordingly, non-contiguous tokens may appear as candidates, thereby reducing noise and focusing on key phrases as candidates. As an example, a user may submit information corresponding to desired features, such as "provide the ability to download all the files at once" and, upon processing, the candidate theme phrase may be "download files," which consists of a non-contiguous token. For each document in the representative set of documents, a document embedding and candidate phrase embedding is created using one or more encoders, such as, but not limited to, a Sentence Transformer encoder, such as a DistillBERT model trained for a natural language inference (NLI) objective. Thereafter, the embeddings may be used to rank candidate phrases. In at least one embodiment, candidate phrases are ranked using maximum marginal relevance (MMR), a diversity-based ranking approach, using the document embedding. It should be appreciated that other ranking methods may be deployed within the scope of the present disclosure. Once ranked, a number of candidates may be retained. The number of retained candidates may be a set number or may be a percentage of the total list, or a combination thereof. As noted above, selection of the retained candidates may be based, at least in part, on a size of the initial list, among other factors.

In various embodiments, candidate phrase are clustered and then mapped back to a phrase. For example, k-means may be used to group semantically similar candidates and to diversify a final set of returned themes. In at least one embodiment, a theme closest to a centroid per cluster is considered and mapped back into the entire phrase it originated from. Returning to the example provided herein, "download files" would be mapped back to "download the files." It should be appreciated that k-means clustering is but one example and that systems and methods may also use additional and/or alternative clustering techniques in order to facilitate final theme selection. For example, a query embedding may be generated by first concatenating all or some documents from the representative set of a cluster, in order, and then using a Sentence Transformer encoder, as noted herein, to construct similar embeddings as those from the candidate theme phrases. The query embedding and the candidate embeddings are then used to rank the candidate theme phrases, such as by using MMR or various other ranking techniques. Accordingly, a final set of themes may be developed that are semantically similar to the representative set of a cluster as a whole, while also being diverse from each other. This in turn uncovers the different facets of an issue that may present itself within a singular cluster. The ranked theme phrases may then be mapped back to the entire phrase it originated from, as noted. Furthermore, various embodiments may also map candidate phrases back to their original phrases prior to the ranking.

Figure 2:
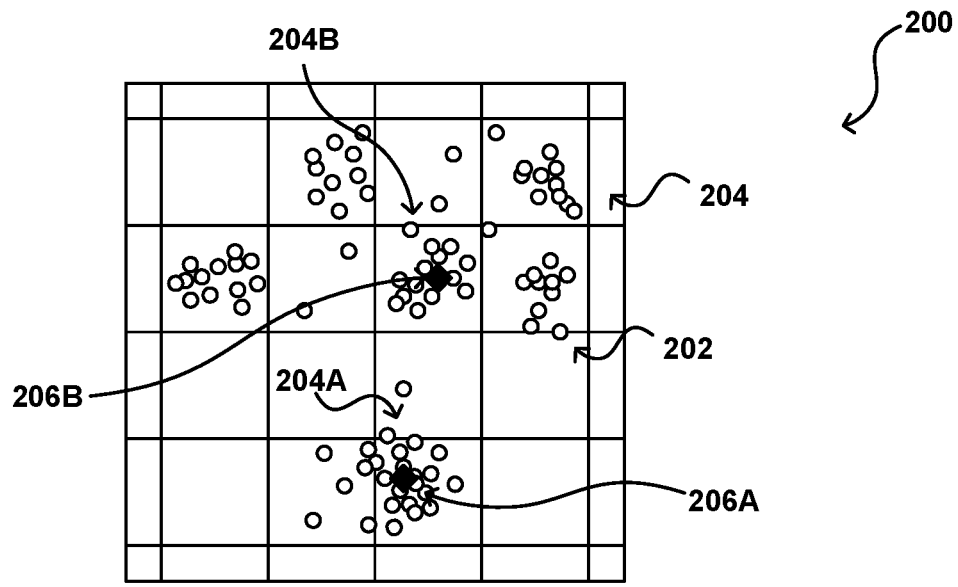
FIG. 2 illustrates a graphical representation of a clustered set of documents that can be generated in accordance with various embodiments.

FIG. 2 illustrates a visual representation 200 of documents 202 corresponding to data (e.g., unstructured text) that has been grouped into clusters 204 using one or more clustering techniques. As noted, the data may be referred to as documents and may correspond to user-provided submissions or notes associated with one or more services or products, among other options. The documents may include text and/or other information, such as images, checked boxes, and the like. The documents may also include metadata that associates the document with a particular service or with a user, where user data may be anonymized. In at least one embodiment, the submissions may be received responsive to a request from a provider or may be provided by a user based on troubleshooting or providing praise for a particular service or product, among other options. Furthermore, in at least one embodiment, the submissions may be collected, aggregated, and prioritized prior to clustering. For example, submissions may be sorted to identify salient information and/or information that exceeds a threshold level of reliability and/or importance. By way of example, a submission that may not provide much guidance, such as "OK" or "NO" responsive to a prompt may be less important than a submission that identifies specific product features, such as "I like the new interface and the way the icons are grouped."

In at least one embodiment, clustering may use a centroid based clustering approach. In this example, a visual representation is provided of a clustering approach. It should be appreciated that the visual representation is provided by way of example only and that, in various embodiments, clustering may represented computationally without providing a visual output of the clusters themselves. For example, documents 202 may be grouped together based on different numerical values. As shown, a number of clusters 204 are identified, such as a first cluster 204A and a second cluster 204B. Each of these clusters 204 may be associated with a particular theme or intent for the documents 202 (shown as circles) forming the clusters. As noted herein, various embodiments may select a number of documents 202 closest to a center 206A, 206B (represented as a diamond) of a particular cluster 204A, 204B in order to identify a representative set of the cluster.

The number of documents 202 selected may be based on a variety of factors, such as a set threshold number, a percentage of documents forming the cluster, and/or the like. In certain examples, the total number of documents 202 within the clusters 204 may be used to determine how many documents to include within the representative set. For example, a larger cluster may be based on a percentage that is different from a smaller cluster. As an illustrative example, a cluster with 10,000 documents may select 1% or 100 documents while a cluster with 50 documents may select 50% or 25 documents. The number of documents may be particularly selected in order to obtain a representative set without selecting too many documents that processing speeds are slowed or that the number becomes unwieldy to evaluate. In certain embodiments, the number of documents may not be based on the total number of documents within the cluster and may be based on a distance from the center. For example, all documents within a threshold distance may be selected, regardless of the number of documents within the cluster or the total number of documents obtained. In this manner, the number of documents for the representative set is driven by distance from the center and may include more or fewer documents based on the threshold distance selected. The threshold distance selected may be tuned, in certain embodiments, based on different factors. For example, it may be determined that different distances are more suitable based on a certain type of clustering or a certain cluster variety, among other options.

Figure 3A:
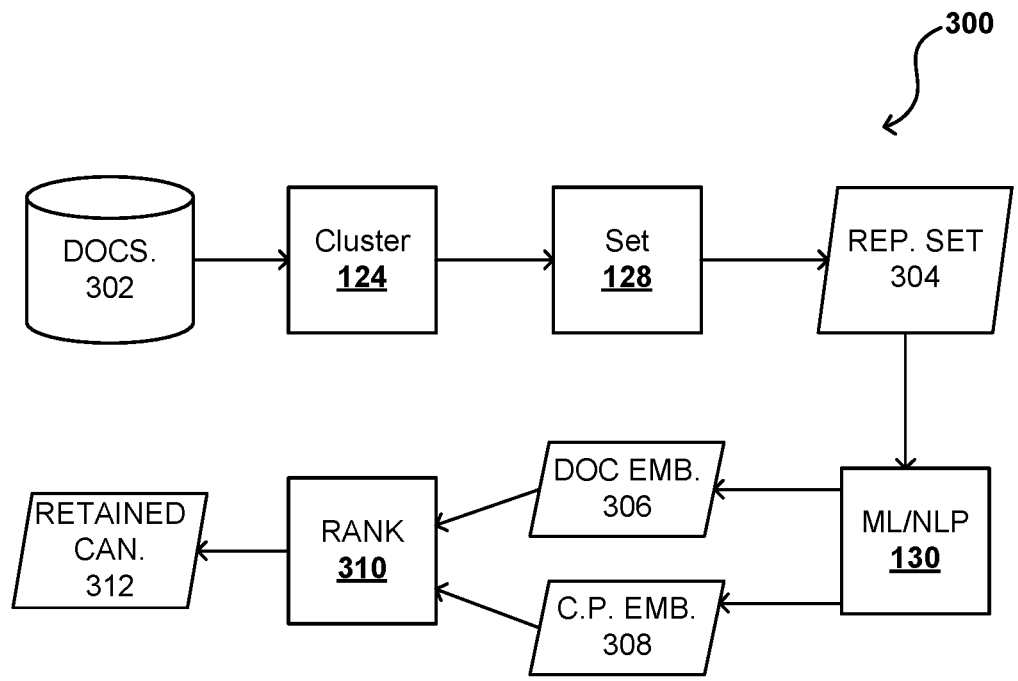
FIG. 3A illustrates a pipeline for extracting and ranking candidate phrases that can be determined in accordance with various embodiments.

FIG. 3A illustrates a schematic pipeline 300 that may be used with embodiments of the present disclosure. In this example, a set of documents 302, which may correspond to submissions or information received from one or more users, is provided to the clustering service 124. The clustering service 124 may generate a number of clusters to group sets of the documents by a central theme, as shown in FIG. 2. The set identifier 128 may evaluate these clusters, identify a number of documents near a center of a cluster, and then select these documents to form a representative set 304. As previously indicated, the representative set 304 may include some number of documents to provide an indication of a common theme for a given cluster. The number of documents may vary based on a variety of factors. The representative set 304 may be representative of a singular cluster generated from the documents 302, and as a result, more than one representative set 304 may be generated for a given set of documents 302. For example, the number of representative sets 304 may be equal to a number of clusters formed by the clustering service 124. However, in other embodiments, the number of representative sets 304 may be greater than or less than the number of clusters formed. Each cluster may not be evaluated for a representative set 304, such as when a cluster is too small or one or more thresholds are not met (e.g., distance from center). In certain embodiments, multiple representative sets 304 may be generated for a given cluster, such as when multiple thresholds are met.

The representative set 304 may be processed using one or more machine learning or NLP systems 130 in order to extract candidate phrases from unstructured texted within the documents forming the representative set 304. This extracted information may be used to generate a document embedding 306 and a candidate phrase embedding 308, among other options. The document embedding 306 may correspond to individual candidate phrases for each document of the representative set. The candidate phrase embedding 308 may correspond to candidate phrases collected over the set of documents within the representative set 304. In at least one embodiment, the embeddings may be processed using a ranker 310 to rank the candidate phrases using one or more methods, such as MMR, as noted. The ranker 310 may also be used to retain a number of retained candidates 312, which may be a set number of candidates and/or may be a percentage of candidate phrases, or some combination thereof.

Figure 3B:
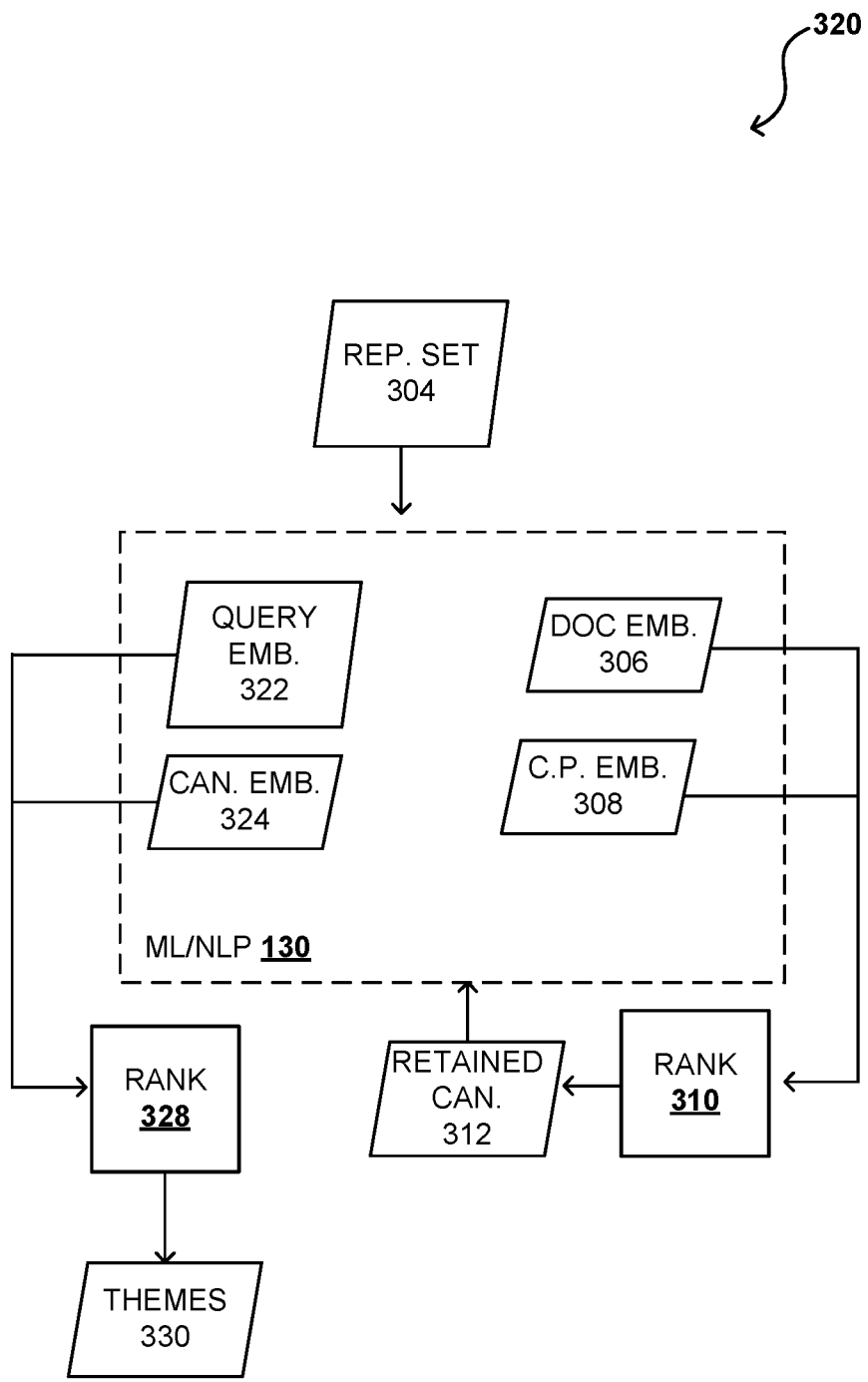
FIG. 3B illustrates a pipeline for extracting and ranking candidate phrases that can be determined in accordance with various embodiments.

FIG. 3B is a schematic pipeline 320 that may be used with embodiments of the present disclosure In this example, final theme selection may include implementing one or more diversity based theme detection and selection processes. For example, a query embedding 322 may be generated from the representative set 304. For example, the system 130 may process each document of the representative set of documents 304 by first concatenating all documents within the representative set of a cluster and then, using one or more encoders as described above, generate the query embeddings 322. In at least one embodiment, similar embeddings are constructed from candidate theme phrases. These embeddings may use, as an input in certain embodiments, the retained candidate theme phrases 312 described with respect to FIG. 3A. For example, the document embeddings 306 and the candidate phrase embeddings 308 may be ranked, such as using the ranker 310, to generate the retained candidate theme phrases 312, which may be further processed using one or more machine learning systems 130. The query embeddings 322 and candidate theme embeddings 324, which may include the embeddings 308 and/or the retained candidates 312, among other options, are used to rank the candidate theme phrases, for example using the ranker 328. It should be appreciated that the rankers 310, 328 may include a variety of different ranking techniques. Moreover, in certain embodiments, the ranker 328 may be different from the ranker 310 used to generate the retained candidates 312. In at least one embodiment, a ranking system may incorporate features of both the rankers 310, 328 such that, based on the input information, different ranking techniques may be selected. In at least one embodiment, the ranker 328 incorporates an MMR technique, as noted herein, but various other ranking methods may be used, including but not limited to a sentiment ranking, an occurrence ranking, a ranking based on user data, a ranking based on popularity, and the like. A final set of themes 330 is obtained that are semantically similar to the representative set of the cluster as a whole, while also being diverse from each other. For example, while an overall theme may be consistent across the documents, individual components or nuances may still be retained, as noted herein.

In an embodiment that includes MMR, ranking may be performed as:

$$\text{MMR} = \text{argmax}_{P_i \in R/S}[\lambda \text{Sim}(P_i, Q) - (1-\lambda)\max_{P_j \in S} \text{Sim}(P_i, P_j)]$$

where Q is the query (e.g., document embedding), P is the candidate phrase in question, R is the set of candidate phrases, S is the subset of candidate phrases already selected, R/S is a set of unselected phrases in R, $\lambda$ is a constant in the range of [0-1] for diversification of results, and Sim is a similarity function, such as cosine similarity, among other options.

In at least one embodiment, k-means clustering may also be used. For example, this method may partition n observations into k clusters based on the nearest mean (e.g., cluster centroid) for a given observation. A random set of cluster centroids may be initialized. The algorithm may then proceed in an EM fashion, where the E-step includes assigning data points to the closest cluster and the M-step computes the centroid of each cluster. Given Data $x_1, \ldots x_n$ such that $x \in \mathbb{R}^d$ with a goal to minimize loss ($\mathcal{L}$). The objective function, E-step, and M-step may be performed as:

$$\mathbb{1} = \Sigma_{i=1}^n \Sigma_{k=1}^K \mathbb{1}\{c_i=k\}\|x_i-\mu_k\|^2$$

Update c: For each i set $c_i = \mathrm{argmin}_k \|x_i-\mu_k\|^2$
Update μ: For each k, set $\mu_k = (\Sigma_i x_i \mathbb{1}\{c_i=k\})/(\Sigma_i \mathbb{1}\{c_i=k\})$ Embodiments of the present disclosure may incorporate one or more methods to deploy machine learning models, which may be unsupervised or substantially unsupervised, to determine themes within a corpus of information, such as a set of documents. Various embodiments include identifying a representative set to extract a theme corresponding to a cluster of documents. From this representative set, candidate theme phrases may be extracted (for example, in the form of bigrams or trigrams) such that for each document, a document embedding and a candidate phrase embedding may be created. These embeddings may then be used to rank the candidate phrases, where ranking may include one or more diversity-based ranking approaches.

In at least one embodiment, final theme selection may include one or more of a centroid-based theme detection and/or a diversity-based theme detection. As noted herein, centroid-based theme detection may include using k-mean clustering for candidate phrases, selecting a closest to the centroid theme, and the mapping themes back to their original phrase. Diversity-based theme detection may be based on one or more of candidate diversity or original phrase diversity. For example, as described herein, candidate phrase diversity may include creating a query embedding by concatenating all document from a representative set and using the generated query embedding, along with candidate embeddings, to rank different candidate theme phrases. Such an approach may provide both a representative theme while maintain diversity between themes. In at least one embodiment, original phrase diversity may overlap with certain features of candidate diversity, but when extracting candidate phrases, these phrases may first be mapped back to their original phrases.

Figure 4:
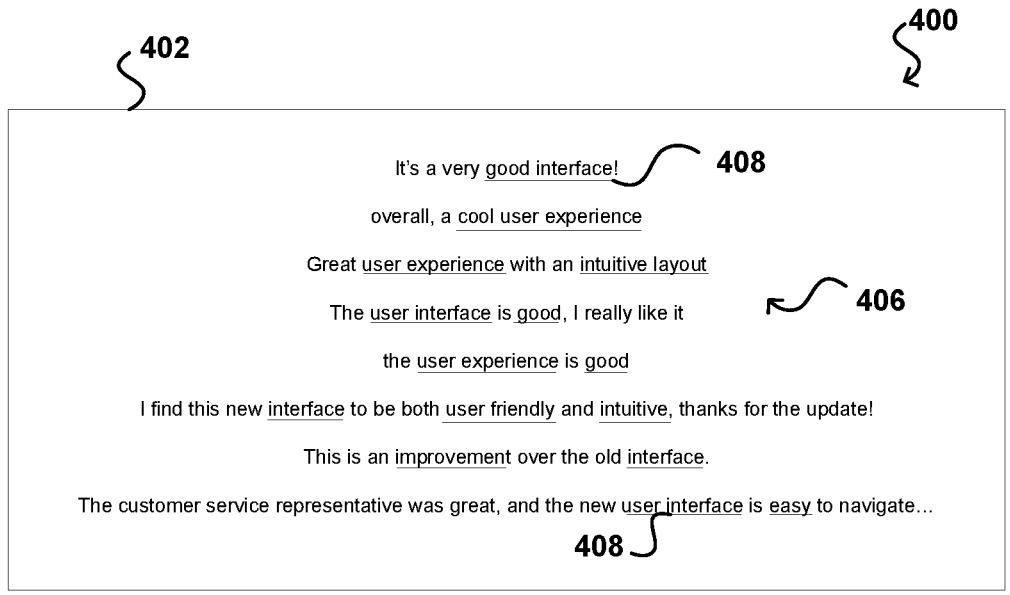
FIG. 4 illustrates a graphical representation of theme identification from a representative set of documents that can be utilized in accordance with various embodiments.
Figure 4:
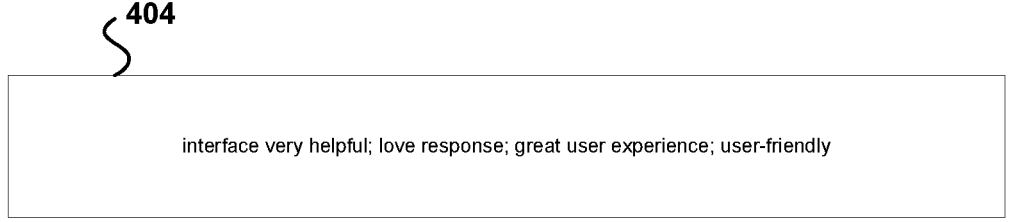

FIG. 4 is a representation 400 of a set of clustering results 402 and associated themes 404 that may be identified from the clustering results 402 using embodiments of the present disclosure. In this example, the clustering results 402 may be pre-ranked and clustered, for example using one or more methods described herein. As shown, a set of original phrases 406 is listed within the clustering results 402, where themes or candidate phrases 408 are underlined illustrating a theme of the phrase. For example, the candidate phrases 406 are snips (e.g., bigrams or trigrams) where certain words may be removed, such as "is" in the example. These candidate phrases may then be used to develop the themes 404, which may be ranked using a diversity-based ranking approach.

For example, the themes 404 may relate to the interface, as the user interface is noted in several original phrases 406. Additionally themes 404 include the user experience and how user-friendly users find aspects associated with the original phrases 406. Accordingly, the representative documents for these given original phrases 406 may be classified as belong to a theme related to the interface, the user experience, and positive sentiment about those features.

Figure 5A:
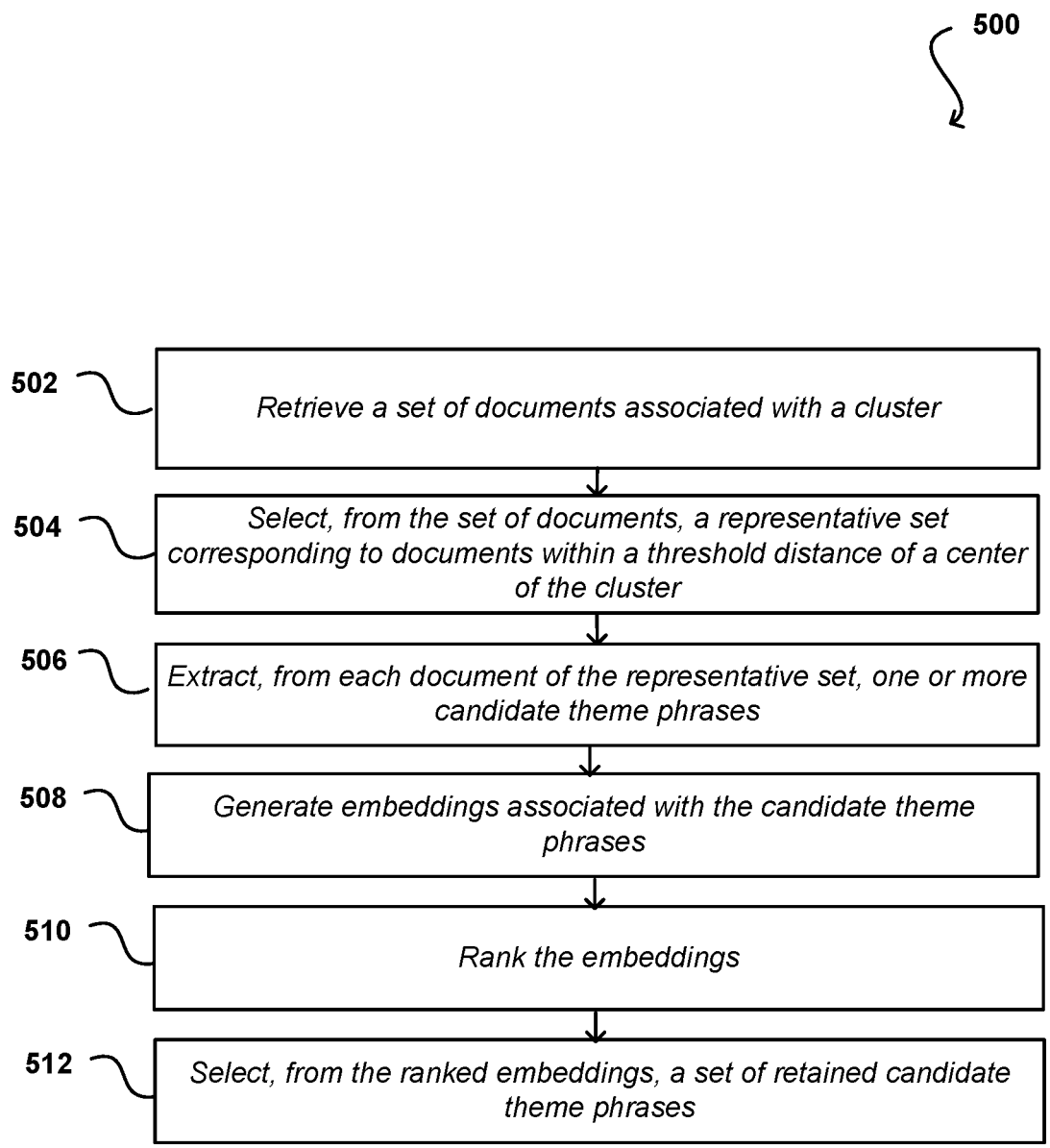
FIG. 5A illustrates an example process for identifying candidate theme phrases that can be utilized in accordance with various embodiments.

FIG. 5A illustrates an example process 500 for identifying themes within clusters of documents that can be utilized in accordance with various embodiments. It should be understood that for this and other processes presented herein that there can be additional, fewer, or alternative steps performed in similar or alternative orders, or at least partially in parallel, within the scope of the various embodiments unless otherwise specifically stated. Further, although this example is presented with respect to document associated with user submissions, advantages of such a process can be obtained for other types of data or content in other settings or environments. In this example, a set of documents associated with a cluster is received 502. The set of documents may correspond to user-provided information, such as information in the form of text, that has been aggregated, prioritized, and clustered. A representative set of documents may be selected from the set of documents 504. For example, documents associated with or near a center of the document may be selected. In at least one embodiment, document within a threshold distance of the center are selected. In other embodiments, a set number of closest documents are selected. In certain embodiments, a number of documents selected varied based on factors such as cluster size, among others.

In at least one embodiment, candidate theme phrases are extracted from each document of the representative set 506. These candidate theme phrases may then be used to generate embeddings 508. For example, the embeddings may include document embeddings and candidate phrase embeddings. The embeddings may then be ranked 510. Ranking may include using a diversity-based ranking approach using at least the document embedding. From the ranking, a set of retained candidate theme phrases may be selected 512. The retained candidate theme phrases may correspond to a set number of top ranked phrases, a percentage of the entire list, or combinations thereof.

Figure 5B:
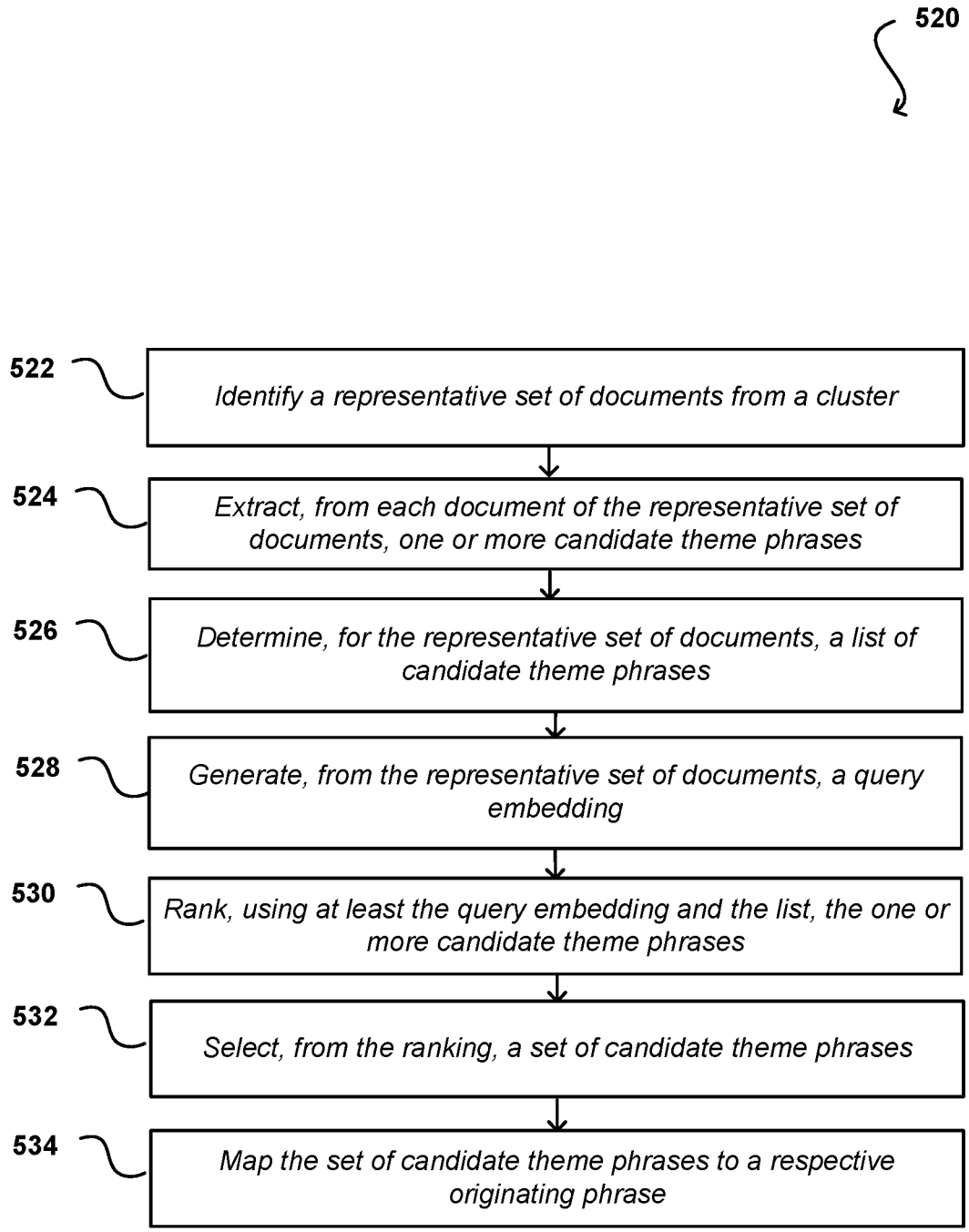
FIG. 5B illustrates an example process for identifying candidate theme phrases that can be utilized in accordance with various embodiments.

FIG. 5B illustrates a process 520 to identify themes within a corpus of information. In this example, a representative set of documents is identified for a cluster 522. Each document in the representative may then be processed to extract one or more candidate theme phrases 524. For example, the documents may be processed using one or more encoders in order to extract key phrases and also to generate one or more embeddings, such as the document embeddings or the candidate theme phrase embeddings described herein. In at least some embodiments, a ranking processes is used to identify a list of candidate theme phrases 526, where the ranking may be based on one or more criteria, such as diversity.

In certain embodiments, a query embedding is generated from the representative set of documents 528. For example, the documents forming the representative set may be concatenated and then processed, such as by using one or more encoders, to extract and generate one or more embeddings, such as a query embedding. The query embedding and the list then be used to rank the one or more candidate phrases identified in the set of documents. In at least one embodiment, ranking may be used to select certain salient or important theme phrases, based on one or more criteria. A set of candidate theme phrases may be selected from the ranking 532 and then mapped back to respective originating phrases 534. In this manner, collections of documents may be evaluated and then ranked to identify common underlying themes while also maintain diversity.

Various embodiments of the present disclosure are directed toward systems and methods that may inject information, such as textual input provided by one or more users, to aggregate, prioritize, cluster, and identify themes within the text. For example, a provider may include a landing page or console for a given service, product, content, etc. where the user may interact with different features or functionality. The user may be prompted, or voluntarily, provided information or comments associated with different aspects of the service. For example, users may interact with the console and then provide information/opinions regarding useability, bugs, compliments, suggestions, and the like. This information may be in the form of unstructured or freeform text, which may include multiple different comments/suggestions at once. That is, the user may include a single submission that provides information or comments on multiple services, some of which may not be associated with the console. Systems and methods are directed toward collecting this data and determining an underlying theme so that the provider can identify common issues and then implement one or more actions based on those issues.

Various embodiments are directed toward evaluating clustered sets of documents to identify a representative set of documents, such as a set of documents near a center of a cluster, among other options. Candidate phrases may be extracted from each document of the set of documents, where the candidate phrases may correspond to short phrases (e.g., bigrams or trigrams) representative of one or more portions of the text. As noted herein, the different phrases may provide diversity by being associated with a common theme, but then providing information to granular comments or specific issues. In various embodiments, the short phrases may permit the use of non-contiguous tokens, for example by using one or more processing steps to remove stop words and the like. In at least one embodiment, one or more machine learning systems, such as NLP systems, which may be unsupervised, may be used to extract the phrases and then to generate embeddings for the documents. These embeddings may then be ranked, for example based on a query embedding that looks at each of the document within the representative set, and a list of relevant topics may be identified. In at least one embodiment, the list of relevant topics may be used within a pipeline in order to identify projects associated with common issues or desired features to prioritize future workflows.

In at least one embodiment, ranking is performed using MMR, which may use diversity as a ranking criteria. Other embodiments may include other ranking criteria, including but not limited to sentiment, frequency, size of user, size of cluster, popularity, and the like. Furthermore, various embodiments may also drive other operations, such as clustering, selection of representative data, and the like based on a variety of factors, such as a size of a cluster, a number of identified phrases, and the like.

Figure 6:
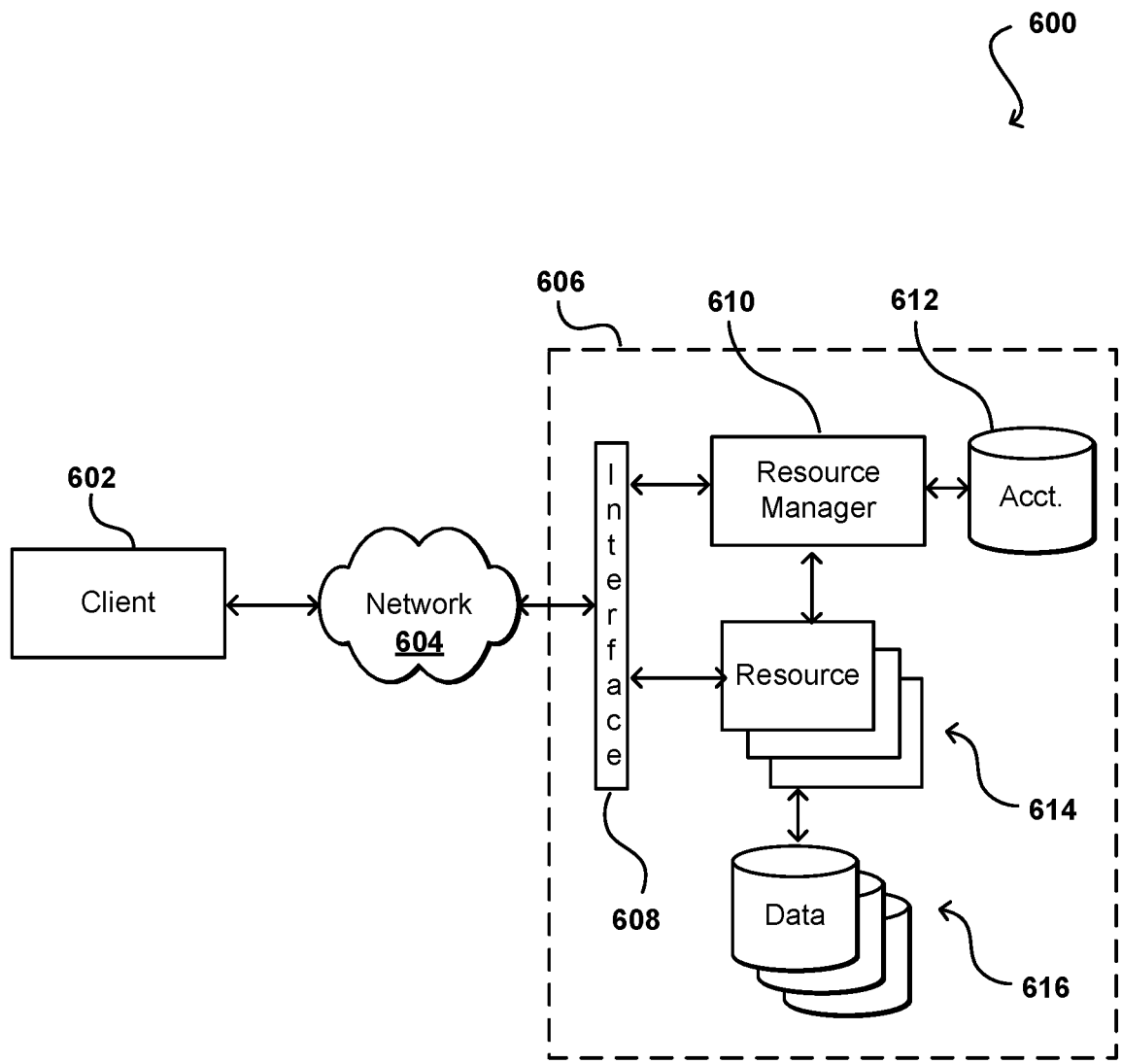
FIG. 6 illustrates components of a resource environment in which aspects of various embodiments can be implemented.

FIG. 6 illustrates an example environment 600 in which aspect of various embodiments can be implemented. Such an environment can be used in various embodiments to provide resource capacity for one or more users, or customers of a resource provider, as part of a shared or multi-tenant resource environment. In this example a user is able to utilize a client device 602 to submit requests across at least one network 604 to a multi-tenant resource provider environment 606. The client device can include any appropriate electronic device operable to send and receive requests, messages, or other such information over an appropriate network and convey information back to a user of the device. Examples of such client devices include personal computers, tablet computers, smart phones, notebook computers, and the like. The at least one network 604 can include any appropriate network, including an intranet, the Internet, a cellular network, a local area network (LAN), or any other such network or combination, and communication over the network can be enabled via one or more wired and/or wireless connections. The resource provider environment 606 can include any appropriate components for receiving requests and returning information or performing actions in response to those requests. As an example, the provider environment might include Web servers and/or application servers for receiving and processing requests, then returning data, Web pages, video, audio, or other such content or information in response to the request. The environment can be secured such that only authorized users have permission to access those resources.

In various embodiments, a provider environment 606 may include various types of resources that can be utilized by multiple users for a variety of different purposes. As used herein, computing and other electronic resources utilized in a network environment can be referred to as "network resources." These can include, for example, servers, databases, load balancers, routers, and the like, which can perform tasks such as to receive, transmit, and/or process data and/or executable instructions. In at least some embodiments, all or a portion of a given resource or set of resources might be allocated to a particular user or allocated for a particular task, for at least a determined period of time. The sharing of these multi-tenant resources from a provider environment is often referred to as resource sharing, Web services, or "cloud computing," among other such terms and depending upon the specific environment and/or implementation. In this example the provider environment includes a plurality of resources 614 of one or more types. These types can include, for example, application servers operable to process instructions provided by a user or database servers operable to process data stored in one or more data stores 616 in response to a user request. As known for such purposes, a user can also reserve at least a portion of the data storage in a given data store. Methods for enabling a user to reserve various resources and resource instances are well known in the art, such that detailed description of the entire process, and explanation of all possible components, will not be discussed in detail herein.

In at least some embodiments, a user wanting to utilize a portion of the resources 614 can submit a request that is received to an interface layer 608 of the provider environment 606. The interface layer can include application programming interfaces (APIs) or other exposed interfaces enabling a user to submit requests to the provider environment. The interface layer 608 in this example can also include other components as well, such as at least one Web server, routing components, load balancers, and the like. When a request to provision a resource is received to the interface layer 608, information for the request can be directed to a resource manager 610 or other such system, service, or component configured to manage user accounts and information, resource provisioning and usage, and other such aspects. A resource manager 610 receiving the request can perform tasks such as to authenticate an identity of the user submitting the request, as well as to determine whether that user has an existing account with the resource provider, where the account data may be stored in at least one data store 612 in the provider environment. A user can provide any of various types of credentials in order to authenticate an identity of the user to the provider. These credentials can include, for example, a username and password pair, biometric data, a digital signature, or other such information. The provider can validate this information against information stored for the user. If a user has an account with the appropriate permissions, status, etc., the resource manager can determine whether there are adequate resources available to suit the user's request, and if so can provision the resources or otherwise grant access to the corresponding portion of those resources for use by the user for an amount specified by the request. This amount can include, for example, capacity to process a single request or perform a single task, a specified period of time, or a recurring/renewable period, among other such values. If the user does not have a valid account with the provider, the user account does not enable access to the type of resources specified in the request, or another such reason is preventing the user from obtaining access to such resources, a communication can be sent to the user to enable the user to create or modify an account, or change the resources specified in the request, among other such options.

Once the user is authenticated, the account verified, and the resources allocated, the user can utilize the allocated resource(s) for the specified capacity, amount of data transfer, period of time, or other such value. In at least some embodiments, a user might provide a session token or other such credentials with subsequent requests in order to enable those requests to be processed on that user session. The user can receive a resource identifier, specific address, or other such information that can enable the client device 602 to communicate with an allocated resource without having to communicate with the resource manager 610, at least until such time as a relevant aspect of the user account changes, the user is no longer granted access to the resource, or another such aspect changes. In some embodiments, a user can run a host operating system on a physical resource, such as a server, which can provide that user with direct access to hardware and software on that server, providing near full access and control over that resource for at least a determined period of time. Access such as this is sometimes referred to as "bare metal" access as a user provisioned on that resource has access to the physical hardware.

A resource manager 610 (or another such system or service) in this example can also function as a virtual layer of hardware and software components that handles control functions in addition to management actions, as may include provisioning, scaling, replication, etc. The resource manager can utilize dedicated APIs in the interface layer 608, where each API can be provided to receive requests for at least one specific action to be performed with respect to the data environment, such as to provision, scale, clone, or hibernate an instance. Upon receiving a request to one of the APIs, a Web services portion of the interface layer can parse or otherwise analyze the request to determine the steps or actions needed to act on or process the call. For example, a Web service call might be received that includes a request to create a data repository.

An interface layer 608 in at least one embodiment includes a scalable set of user-facing servers that can provide the various APIs and return the appropriate responses based on the API specifications. The interface layer also can include at least one API service layer that in one embodiment consists of stateless, replicated servers which process the externally-facing user APIs. The interface layer can be responsible for Web service front end features such as authenticating users based on credentials, authorizing the user, throttling user requests to the API servers, validating user input, and marshalling or unmarshalling requests and responses. The API layer also can be responsible for reading and writing database configuration data to/from the administration data store, in response to the API calls. In many embodiments, the Web services layer and/or API service layer will be the only externally visible component, or the only component that is visible to, and accessible by, users of the control service. The servers of the Web services layer can be stateless and scaled horizontally as known in the art. API servers, as well as the persistent data store, can be spread across multiple data centers in a region, for example, such that the servers are resilient to single data center failures.

Figure 7:
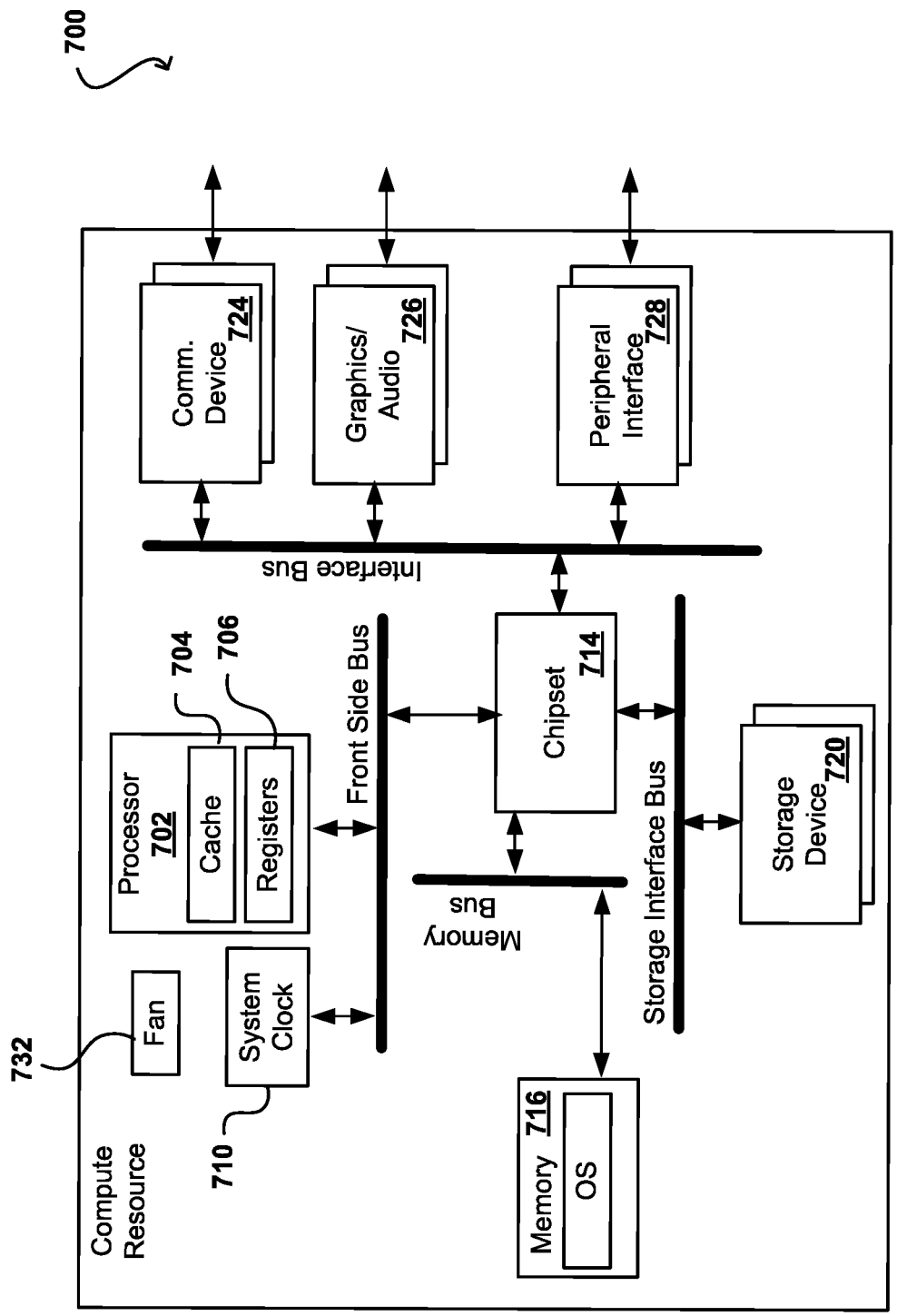
FIG. 7 illustrates example components of a computing device that can be used to implement aspects of various embodiments.

Computing resources, such as servers or personal computers, will generally include at least a set of standard components configured for general purpose operation, although various proprietary components and configurations can be used as well within the scope of the various embodiments. FIG. 7 illustrates components of an example computing resource 700 that can be utilized in accordance with various embodiments. It should be understood that there can be many such compute resources and many such components provided in various arrangements, such as in a local network or across the Internet or "cloud," to provide compute resource capacity as discussed elsewhere herein. The computing resource 700 (e.g., a desktop or network server) will have one or more processors 702, such as central processing units (CPUs), graphics processing units (GPUs), and the like, that are electronically and/or communicatively coupled with various components using various buses, traces, and other such mechanisms. A processor 702 can include memory registers 706 and cache memory 704 for holding instructions, data, and the like. In this example, a chipset 714, which can include a northbridge and southbridge in some embodiments, can work with the various system buses to connect the processor 702 to components such as system memory 716, in the form or physical RAM or ROM, which can include the code for the operating system as well as various other instructions and data utilized for operation of the computing device. The computing device can also contain, or communicate with, one or more storage devices 720, such as hard drives, flash drives, optical storage, and the like, for persisting data and instructions similar, or in addition to, those stored in the processor and memory. The processor 702 can also communicate with various other components via the chipset 714 and an interface bus (or graphics bus, etc.), where those components can include communications devices 724 such as cellular modems or network cards, media components 726, such as graphics cards and audio components, and peripheral interfaces 728 for connecting peripheral devices, such as printers, keyboards, and the like. At least one cooling fan 732 or other such temperature regulating or reducing component can also be included as well, which can be driven by the processor or triggered by various other sensors or components on, or remote from, the device. Various other or alternative components and configurations can be utilized as well as known in the art for computing devices.

At least one processor 702 can obtain data from physical memory 716, such as a dynamic random access memory (DRAM) module, via a coherency fabric in some embodiments. It should be understood that various architectures can be utilized for such a computing device, that may include varying selections, numbers, and arguments of buses and bridges within the scope of the various embodiments. The data in memory may be managed and accessed by a memory controller, such as a DDR controller, through the coherency fabric. The data may be temporarily stored in a processor cache 704 in at least some embodiments. The computing device 700 can also support multiple I/O devices using a set of I/O controllers connected via an I/O bus. There may be I/O controllers to support respective types of I/O devices, such as a universal serial bus (USB) device, data storage (e.g., flash or disk storage), a network card, a peripheral component interconnect express (PCIe) card or interface 728, a communication device 724, a graphics or audio card 726, and a direct memory access (DMA) card, among other such options. In some embodiments, components such as the processor, controllers, and caches can be configured on a single card, board, or chip (i.e., a system-on-chip implementation), while in other embodiments at least some of the components may be located in different locations, etc.

An operating system (OS) running on the processor 702 can help to manage the various devices that may be utilized to provide input to be processed. This can include, for example, utilizing relevant device drivers to enable interaction with various I/O devices, where those devices may relate to data storage, device communications, user interfaces, and the like. The various I/O devices will typically connect via various device ports and communicate with the processor and other device components over one or more buses. There can be specific types of buses that provide for communications according to specific protocols, as may include peripheral component interconnect) PCI or small computer system interface (SCSI) communications, among other such options. Communications can occur using registers associated with the respective ports, including registers such as data-in and data-out registers. Communications can also occur using memory-mapped I/O, where a portion of the address space of a processor is mapped to a specific device, and data is written directly to, and from, that portion of the address space.

Such a device may be used, for example, as a server in a server farm or data warehouse. Server computers often have a need to perform tasks outside the environment of the CPU and main memory (i.e., RAM). For example, the server may need to communicate with external entities (e.g., other servers) or process data using an external processor (e.g, a General Purpose Graphical Processing Unit (GPGPU)). In such cases, the CPU may interface with one or more I/O devices. In some cases, these I/O devices may be special-purpose hardware designed to perform a specific role. For example, an Ethernet network interface controller (NIC) may be implemented as an application specific integrated circuit (ASIC) comprising digital logic operable to send and receive messages, such as datagrams.

In an illustrative embodiment, a host computing device is associated with various hardware components, software components and respective configurations that facilitate the execution of I/O requests. One such component is an I/O adapter that inputs and/or outputs data along a communication channel. In one aspect, the I/O adapter device can communicate as a standard bridge component for facilitating access between various physical and emulated components and a communication channel. In another aspect, the I/O adapter device can include embedded microprocessors to allow the I/O adapter device to execute computer executable instructions related to the implementation of management functions or the management of one or more such management functions, or to execute other computer executable instructions related to the implementation of the I/O adapter device. In some embodiments, the I/O adapter device may be implemented using multiple discrete hardware elements, such as multiple cards or other devices. A management controller can be configured in such a way to be electrically isolated from any other component in the host device other than the I/O adapter device. In some embodiments, the I/O adapter device is attached externally to the host device. In some embodiments, the I/O adapter device is internally integrated into the host device. Also in communication with the I/O adapter device may be an external communication port component for establishing communication channels between the host device and one or more network-based services or other network-attached or direct-attached computing devices Illustratively, the external communication port component can correspond to a network switch, sometimes known as a Top of Rack ("TOR") switch. The I/O adapter device can utilize the external communication port component to maintain communication channels between one or more services and the host device, such as health check services, financial services, and the like.

The I/O adapter device can also be in communication with a Basic Input/Output System (BIOS) component. The BIOS component can include non-transitory executable code, often referred to as firmware, which can be executed by one or more processors and used to cause components of the host device to initialize and identify system devices such as the video display card, keyboard and mouse, hard disk drive, optical disc drive and other hardware. The BIOS component can also include or locate boot loader software that will be utilized to boot the host device. For example, in one embodiment, the BIOS component can include executable code that, when executed by a processor, causes the host device to attempt to locate Preboot Execution Environment (PXE) boot software. Additionally, the BIOS component can include or takes the benefit of a hardware latch that is electrically controlled by the I/O adapter device. The hardware latch can restrict access to one or more aspects of the BIOS component, such controlling modifications or configurations of the executable code maintained in the BIOS component. The BIOS component can be connected to (or in communication with) a number of additional computing device resources components, such as processors, memory, and the like. In one embodiment, such computing device resource components may be physical computing device resources in communication with other components via the communication channel. The communication channel can correspond to one or more communication buses, such as a shared bus (e.g., a front side bus, a memory bus), a point-to-point bus such as a PCI or PCI Express bus, etc., in which the components of the bare metal host device communicate. Other types of communication channels, communication media, communication buses or communication protocols (e.g., the Ethernet communication protocol) may also be utilized. Additionally, in other embodiments, one or more of the computing device resource components may be virtualized hardware components emulated by the host device. In such embodiments, the I/O adapter device can implement a management process in which a host device is configured with physical or emulated hardware components based on a variety of criteria. The computing device resource components may be in communication with the I/O adapter device via the communication channel. In addition, a communication channel may connect a PCI Express device to a CPU via a northbridge or host bridge, among other such options.

In communication with the I/O adapter device via the communication channel may be one or more controller components for managing hard drives or other forms of memory. An example of a controller component can be a SATA hard drive controller. Similar to the BIOS component, the controller components can include or take the benefit of a hardware latch that is electrically controlled by the I/O adapter device. The hardware latch can restrict access to one or more aspects of the controller component. Illustratively, the hardware latches may be controlled together or independently. For example, the I/O adapter device may selectively close a hardware latch for one or more components based on a trust level associated with a particular user. In another example, the I/O adapter device may selectively close a hardware latch for one or more components based on a trust level associated with an author or distributor of the executable code to be executed by the I/O adapter device. In a further example, the I/O adapter device may selectively close a hardware latch for one or more components based on a trust level associated with the component itself. The host device can also include additional components that are in communication with one or more of the illustrative components associated with the host device. Such components can include devices, such as one or more controllers in combination with one or more peripheral devices, such as hard disks or other storage devices. Additionally, the additional components of the host device can include another set of peripheral devices, such as Graphics Processing Units ("GPUs"). The peripheral devices and can also be associated with hardware latches for restricting access to one or more aspects of the component. As mentioned above, in one embodiment, the hardware latches may be controlled together or independently.

As discussed, different approaches can be implemented in various environments in accordance with the described embodiments. As will be appreciated, although a network- or Web-based environment is used for purposes of explanation in several examples presented herein, different environments may be used, as appropriate, to implement various embodiments. Such a system can include at least one electronic client device, which can include any appropriate device operable to send and receive requests, messages or information over an appropriate network and convey information back to a user of the device. Examples of such client devices include personal computers, cell phones, handheld messaging devices, laptop computers, set-top boxes, personal data assistants, electronic book readers and the like. The network can include any appropriate network, including an intranet, the Internet, a cellular network, a local area network or any other such network or combination thereof. Components used for such a system can depend at least in part upon the type of network and/or environment selected. Protocols and components for communicating via such a network are well known and will not be discussed herein in detail. Communication over the network can be enabled via wired or wireless connections and combinations thereof. In this example, the network includes the Internet, as the environment includes a Web server for receiving requests and serving content in response thereto, although for other networks, an alternative device serving a similar purpose could be used, as would be apparent to one of ordinary skill in the art.

The illustrative environment includes at least one application server and a data store. It should be understood that there can be several application servers, layers or other elements, processes or components, which may be chained or otherwise configured, which can interact to perform tasks such as obtaining data from an appropriate data store. As used herein, the term "data store" refers to any device or combination of devices capable of storing, accessing and retrieving data, which may include any combination and number of data servers, databases, data storage devices and data storage media, in any standard, distributed or clustered environment. The application server can include any appropriate hardware and software for integrating with the data store as needed to execute aspects of one or more applications for the client device and handling a majority of the data access and business logic for an application. The application server provides access control services in cooperation with the data store and is able to generate content such as text, graphics, audio and/or video to be transferred to the user, which may be served to the user by the Web server in the form of HTML, XML or another appropriate structured language in this example. The handling of all requests and responses, as well as the delivery of content between the client device and the application server, can be handled by the Web server. It should be understood that the Web and application servers are not required and are merely example components, as structured code discussed herein can be executed on any appropriate device or host machine as discussed elsewhere herein.

The data store can include several separate data tables, databases or other data storage mechanisms and media for storing data relating to a particular aspect. For example, the data store illustrated includes mechanisms for storing content (e.g., production data) and user information, which can be used to serve content for the production side. The data store is also shown to include a mechanism for storing log or session data. It should be understood that there can be many other aspects that may need to be stored in the data store, such as page image information and access rights information, which can be stored in any of the above listed mechanisms as appropriate or in additional mechanisms in the data store. The data store is operable, through logic associated therewith, to receive instructions from the application server and obtain, update or otherwise process data in response thereto. In one example, a user might submit a search request for a certain type of item. In this case, the data store might access the user information to verify the identity of the user and can access the catalog detail information to obtain information about items of that type. The information can then be returned to the user, such as in a results listing on a Web page that the user is able to view via a browser on the user device. Information for a particular item of interest can be viewed in a dedicated page or window of the browser.

Each server typically will include an operating system that provides executable program instructions for the general administration and operation of that server and typically will include computer-readable medium storing instructions that, when executed by a processor of the server, allow the server to perform its intended functions. Suitable implementations for the operating system and general functionality of the servers are known or commercially available and are readily implemented by persons having ordinary skill in the art, particularly in light of the disclosure herein.

The environment in one embodiment is a distributed computing environment utilizing several computer systems and components that are interconnected via communication links, using one or more computer networks or direct connections. However, it will be appreciated by those of ordinary skill in the art that such a system could operate equally well in a system having fewer or a greater number of components than are illustrated. Thus, the depiction of the systems herein should be taken as being illustrative in nature and not limiting to the scope of the disclosure.

The various embodiments can be further implemented in a wide variety of operating environments, which in some cases can include one or more user computers or computing devices which can be used to operate any of a number of applications. User or client devices can include any of a number of general purpose personal computers, such as desktop or laptop computers running a standard operating system, as well as cellular, wireless and handheld devices running mobile software and capable of supporting a number of networking and messaging protocols. Such a system can also include a number of workstations running any of a variety of commercially-available operating systems and other known applications for purposes such as development and database management. These devices can also include other electronic devices, such as dummy terminals, thin-clients, gaming systems and other devices capable of communicating via a network.

Most embodiments utilize at least one network that would be familiar to those skilled in the art for supporting communications using any of a variety of commercially-available protocols, such as TCP/IP, FTP, UPnP, NFS, and CIFS. The network can be, for example, a local area network, a wide-area network, a virtual private network, the Internet, an intranet, an extranet, a public switched telephone network, an infrared network, a wireless network and any combination thereof.

In embodiments utilizing a Web server, the Web server can run any of a variety of server or mid-tier applications, including HTTP servers, FTP servers, CGI servers, data servers, Java servers and business application servers. The server(s) may also be capable of executing programs or scripts in response requests from user devices, such as by executing one or more Web applications that may be implemented as one or more scripts or programs written in any programming language, such as Java®, C, C# or C++ or any scripting language, such as Perl, Python or TCL, as well as combinations thereof. The server(s) may also include database servers, including without limitation those commercially available from Oracle °, Microsoft®, Sybase® and IBM® as well as open-source servers such as MySQL, Postgres, SQLite, MongoDB, and any other server capable of storing, retrieving and accessing structured or unstructured data. Database servers may include table-based servers, document-based servers, unstructured servers, relational servers, non-relational servers or combinations of these and/or other database servers.

The environment can include a variety of data stores and other memory and storage media as discussed above. These can reside in a variety of locations, such as on a storage medium local to (and/or resident in) one or more of the computers or remote from any or all of the computers across the network. In a particular set of embodiments, the information may reside in a storage-area network (SAN) familiar to those skilled in the art. Similarly, any necessary files for performing the functions attributed to the computers, servers or other network devices may be stored locally and/or remotely, as appropriate. Where a system includes computerized devices, each such device can include hardware elements that may be electrically coupled via a bus, the elements including, for example, at least one central processing unit (CPU), at least one input device (e.g., a mouse, keyboard, controller, touch-sensitive display element or keypad) and at least one output device (e.g., a display device, printer or speaker). Such a system may also include one or more storage devices, such as disk drives, magnetic tape drives, optical storage devices and solid-state storage devices such as random access memory (RAM) or read-only memory (ROM), as well as removable media devices, memory cards, flash cards, etc.

Such devices can also include a computer-readable storage media reader, a communications device (e.g., a modem, a network card (wireless or wired), an infrared communication device) and working memory as described above. The computer-readable storage media reader can be connected with, or configured to receive, a computer-readable storage medium representing remote, local, fixed and/or removable storage devices as well as storage media for temporarily and/or more permanently containing, storing, transmitting and retrieving computer-readable information. The system and various devices also typically will include a number of software applications, modules, services or other elements located within at least one working memory device, including an operating system and application programs such as a client application or Web browser. It should be appreciated that alternate embodiments may have numerous variations from that described above. For example, customized hardware might also be used and/or particular elements might be implemented in hardware, software (including portable software, such as applets) or both. Further, connection to other computing devices such as network input/output devices may be employed.

Storage media and other non-transitory computer readable media for containing code, or portions of code, can include any appropriate media known or used in the art, such as but not limited to volatile and non-volatile, removable and non-removable media implemented in any method or technology for storage of information such as computer readable instructions, data structures, program modules or other data, including RAM, ROM, EEPROM, flash memory or other memory technology, CD-ROM, digital versatile disk (DVD) or other optical storage, magnetic cassettes, magnetic tape, magnetic disk storage or other magnetic storage devices or any other medium which can be used to store the desired information and which can be accessed by a system device. Based on the disclosure and teachings provided herein, a person of ordinary skill in the art will appreciate other ways and/or methods to implement the various embodiments.

The specification and drawings are, accordingly, to be regarded in an illustrative rather than a restrictive sense. It will, however, be evident that various modifications and changes may be made thereunto without departing from the broader spirit and scope of the invention as set forth in the claims.

What is claimed is:

1. A computer-implemented method, comprising:
   retrieving a set of documents including unstructured text associated with a cluster, the cluster grouping the set of documents based on one or more central themes;
   selecting, from the set of documents, a representative set;
   extracting, from portions of the unstructured text in respective documents forming the representative set, one or more candidate theme phrases;
   generating, for each document forming the representative set, a document embedding corresponding to individual candidate theme phrases extracted from the document;
   generating a candidate phrase embedding corresponding to a set of candidate theme phrases collected from each document of the representative set;
   ranking the one or more candidate theme phrases based, at least in part, on the respective document embeddings and the candidate phrase embedding;
   selecting, from the ranking, a set of retained candidate theme phrases;
   generating, from the representative set, a query embedding corresponding to a concatenated combination of the representative set;
   ranking the one or more candidate theme phrases from the query embedding and the set of retained candidate theme phrases;
   selecting, based on the ranking, a refined set of retained candidate theme phrases corresponding to a set of semantically similar retained candidate theme phrases associated with the representative set;
   determining a retained candidate theme phrase of the refined set of retained candidate theme phrases corresponds to a workflow item; and
   changing a priority level for the workflow item.

2. The computer-implemented method of claim 1, further comprising:
generating a query document corresponding to a concatenated collection of documents in the representative set.

3. The computer-implemented method of claim 1, wherein at least one of the rankings is based on maximal marginal relevance.

4. The computer-implemented method of claim 1, further comprising:
mapping the refined set of candidate theme phrases back to respective originating phrases.

5. A method comprising:
determining a representative set of documents from a cluster, based at least in part on one or more metrics associated with a target number of documents;
generating, for each document in the representative set, one or more document embeddings for extracted candidate theme phrases in the form of one or more bi-grams or tri-grams;
generating, for extracted theme phrases from the representative set, one or more embeddings;
identifying, using a diversity-based ranking approach, a set of theme phrases from the one or more document embeddings and the one or more embeddings;
generating, for the representative set of documents, a query embedding including information from each document of the representative set of documents; and
selecting, using the diversity-based ranking approach, a ranked set of theme phrases having a semantic similarity to at least a portion of the cluster and being diverse from other theme phrases in the ranked set of theme phrases, based at least on the query embedding and the set of theme phrases.

6. The method of claim 5, wherein the query embedding is based on a concatenated collection of each document in the representative set of documents.

7. The method of claim 5, wherein the diversity-based ranking approach is maximum marginal relevance.

8. The method of claim 5, wherein the cluster is generated using a centroid-based clustering algorithm.

9. The method of claim 5, further comprising:
extracting, from the documents forming the representative set, one or more candidate theme phrases; and
removing one or more portions of the candidate theme phrases to generate the theme phrases.

10. The method of claim 9, wherein the removing includes removing stop words.

11. The method of claim 5, wherein the extracted theme phrases include non-contiguous tokens.

12. The method of claim 5, further comprising:
mapping the ranked set of theme phrases back to a respective originating phrase.

13. The method of claim 5, wherein the theme phrases are extracted using a sentence transformer encoder.

14. The method of claim 5, further comprising:
generating an action item based on a ranked theme phrase of the ranked set of theme phrases; and
providing a notification to a user including the action item.

15. The method of claim 5, wherein the representative set includes a number of documents based on a respective distance from a center of the cluster.

16. A system, comprising:
at least one processor; and
memory including instructions that, when executed by the at least one processor, cause the system to:
determine a representative set of documents from a cluster, based at least in part on one or more metrics associated with a target number of documents;
generate, for each document in the representative set, one or more document embeddings for extracted candidate theme phrases in the form of one or more bi-grams or tri-grams;
generate, for extracted theme phrases from the representative set, one or more embeddings;
identify, using a diversity-based ranking approach, a set of theme phrases from the one or more document embeddings and the one or more embeddings;
generate, for the representative set of documents, a query embedding including information from each document of the representative set of documents; and
select, using the diversity-based ranking approach, a ranked set of theme phrases having a semantic similarity to at least a portion of the cluster and being diverse from other theme phrases in the ranked set of theme phrases, based at least on the query embedding and the set of theme phrases.

17. The system of claim 16, wherein the query embedding is based on a concatenated collection of each document in the representative set of documents.

18. The system of claim 16, wherein the diversity-based ranking approach is maximum marginal relevance.

19. The system of claim 16, wherein the cluster is generated using a centroid-based clustering algorithm.

20. The system of claim 16, wherein the instructions when executed further cause the system to:
map the ranked set of theme phrases back to a respective originating phrase.

* * * * *